(12) United States Patent
Trzynadlowski

(10) Patent No.: US 12,190,071 B1
(45) Date of Patent: Jan. 7, 2025

(54) CONVERSATIONAL AUGMENTATION

(71) Applicant: Apple Inc., Cupertino, CA (US)

(72) Inventor: Bart Colin Trzynadlowski, Reno, NV (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/306,602

(22) Filed: May 3, 2021

Related U.S. Application Data

(60) Provisional application No. 63/044,006, filed on Jun. 25, 2020.

(51) Int. Cl.
   *G06F 40/42* (2020.01)
   *G06F 40/169* (2020.01)
   *G06F 40/30* (2020.01)

(52) U.S. Cl.
   CPC ............ *G06F 40/42* (2020.01); *G06F 40/169* (2020.01); *G06F 40/30* (2020.01)

(58) Field of Classification Search
   CPC .......... G06F 40/30; G06F 40/35; G06F 16/00; G06F 16/907; G06F 40/42; G06F 40/169
   See application file for complete search history.

(56) References Cited

U.S. PATENT DOCUMENTS

| | | | |
|---|---|---|---|
| 7,260,771 B2 * | 8/2007 | Chiu ...................... | G06Q 10/10 715/201 |
| 8,407,049 B2 | 3/2013 | Cromack et al. | |
| 8,630,961 B2 * | 1/2014 | Beilby .................... | G06N 3/004 706/11 |
| 2006/0053196 A1 * | 3/2006 | Spataro ................ | G06Q 10/107 709/205 |
| 2006/0155785 A1 * | 7/2006 | Berry .................... | H04L 65/403 |
| 2007/0277121 A1 * | 11/2007 | Beckman ................ | G06F 16/00 715/847 |
| 2008/0147407 A1 * | 6/2008 | Da Palma ............... | G10L 15/22 704/E15.04 |
| 2008/0168134 A1 * | 7/2008 | Goodman ........... | G06F 16/9535 709/204 |
| 2008/0275701 A1 * | 11/2008 | Wu ........................ | G06F 16/685 704/235 |
| 2011/0033036 A1 * | 2/2011 | Edwards ................ | G06Q 30/02 379/265.09 |
| 2013/0329868 A1 * | 12/2013 | Midtun ............. | H04M 3/42221 704/235 |
| 2013/0332536 A1 * | 12/2013 | Kho ...................... | G06Q 10/101 709/205 |
| 2015/0032829 A1 * | 1/2015 | Barshow ............... | H04L 51/216 709/206 |

(Continued)

*Primary Examiner* — Wilson W Tsui
(74) *Attorney, Agent, or Firm* — Fernando & Partners, LLP

(57) ABSTRACT

Various implementations disclosed herein include devices, systems, and methods for conversational augmentation. In various implementations, a device includes a display, a processor and a non-transitory memory. In some implementations, the method includes, while a user of the device is in a current conversation with a person, detecting a reference to a previous conversation. In some implementations, the method includes determining whether there are user-curated notes that satisfy a relevance threshold associated with the current conversation. In some implementations, the method includes presenting a portion of the user-curated notes that satisfies the relevance threshold associated with the current conversation.

23 Claims, 13 Drawing Sheets

(56) References Cited

U.S. PATENT DOCUMENTS

| | | | |
|---|---|---|---|
| 2015/0181020 A1 | 6/2015 | Fitzsimmons et al. | |
| 2016/0164813 A1* | 6/2016 | Anderson | H04L 51/216 |
| | | | 709/206 |
| 2016/0241500 A1* | 8/2016 | Bostick | H04L 51/10 |
| 2017/0026254 A1* | 1/2017 | Adylov | G06K 9/00523 |
| 2017/0094047 A1* | 3/2017 | Todasco | H04M 3/493 |
| 2018/0004406 A1* | 1/2018 | Jung | G06V 30/1423 |
| 2018/0046726 A1* | 2/2018 | Zhang | G06F 16/9577 |
| 2019/0130415 A1* | 5/2019 | Cheah | G06N 3/0445 |
| 2019/0348063 A1* | 11/2019 | Vaculin | G06V 40/174 |
| 2021/0240775 A1* | 8/2021 | Liu | G06F 16/9035 |

\* cited by examiner

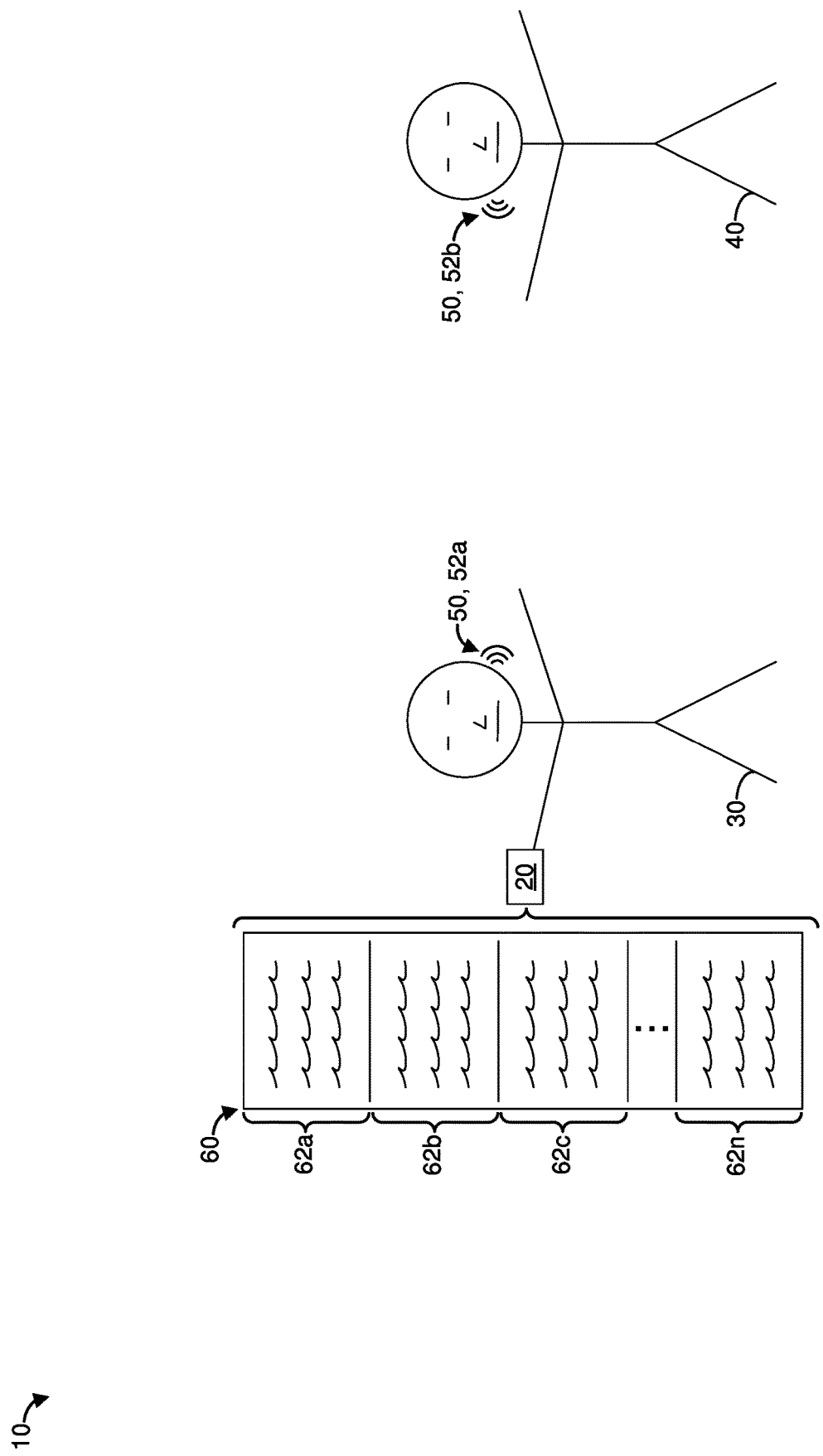

CONVERSATIONAL AUGMENTATION

CROSS-REFERENCE TO RELATED APPLICATION

This application claims the benefit of U.S. Provisional Patent App. No. 63/044,006, filed on Jun. 25, 2020, which is incorporated by reference in its entirety.

TECHNICAL FIELD

The present disclosure generally relates to conversational augmentation.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1I are diagrams of an example operating environment in accordance with some implementations.

Figure 1B:
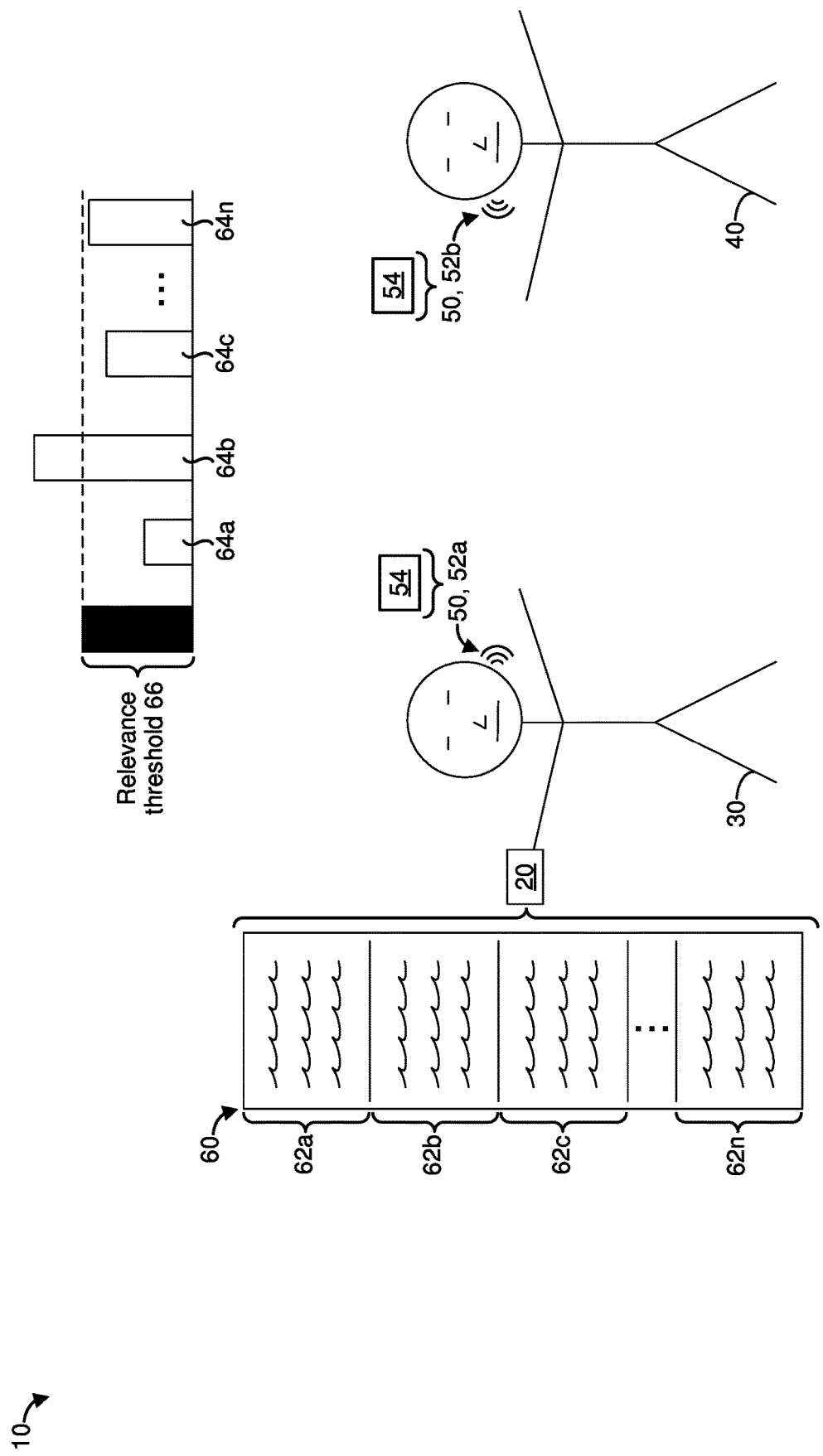

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for conversational augmentation. In various implementations, a device includes a display, a processor and a non-transitory memory. In some implementations, the method includes, while a user of the device is in a current conversation with a person, detecting a reference to a previous conversation. In some implementations, the method includes determining whether there are user-curated notes that satisfy a relevance threshold associated with the current conversation. In some implementations, the method includes presenting a portion of the user-curated notes that satisfies the relevance threshold associated with the current conversation.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A current conversation of a user with a person may sometimes include references to a previous conversation. For example, the user or the person with whom the user is conversing may refer to certain information that was discussed in the previous conversation. As such, the user may attempt to search through the user's notes to find the information that was discussed in the previous conversation. Searching through the user's notes or scrolling through the user's notes can be a time-consuming operation. Furthermore, searching or scrolling through the user's notes may detract from the user experience, for example, because the user is engaged in searching instead of conversing. Additionally, searching or scrolling through the user's notes may result in a sequence of user inputs that unnecessarily drain a battery of a battery-powered device thereby adversely impacting operability of the device.

The present disclosure provides methods, systems, and/or devices for conversational augmentation. A device detects that a user of the device is engaged in a current conversation with a person. The device augments the current conversation with the person by displaying relevant portions of user-curated notes that relate to a previous conversation. While the current conversation is occurring, the device searches for relevant portions of the user-curated notes that were generated during or soon after a previous conversation with the person. The device determines that a portion of the user-curated notes is relevant to the current conversation if the portion of the user-curated notes includes information that is being sought in the current conversation. For example, the device determines that a portion of the user-curated notes is relevant to the current conversation if the portion of the user-curated notes includes an answer to a question being asked in the current conversation.

Identifying and presenting a portion of the user-curated notes that is relevant to the current conversation reduces the need for the user to manually search the user-curated notes or scroll through the user-curated notes to find a portion of the user-curated notes that is relevant to the current conversation. Reducing the need for the user to manually search or scroll through the user-curated notes results in fewer user inputs. Reducing a number of unnecessary user inputs tends to prolong a battery life of a battery-powered device thereby enhancing operability of the device. Presenting the portion of the user-curated notes that is relevant to the current conversation enhances a user experience of the device. For example, presenting the portion of the user-curated notes without user intervention allows the user to stay engaged in the current conversation instead of halting the current conversation to search through the user-curated notes.

FIG. 1A is a diagram of an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20, a user 30 of the electronic device 20 and a person 40. In some implementations, the electronic device 20 includes a handheld computing device that can be held by the user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

Figure 4A:
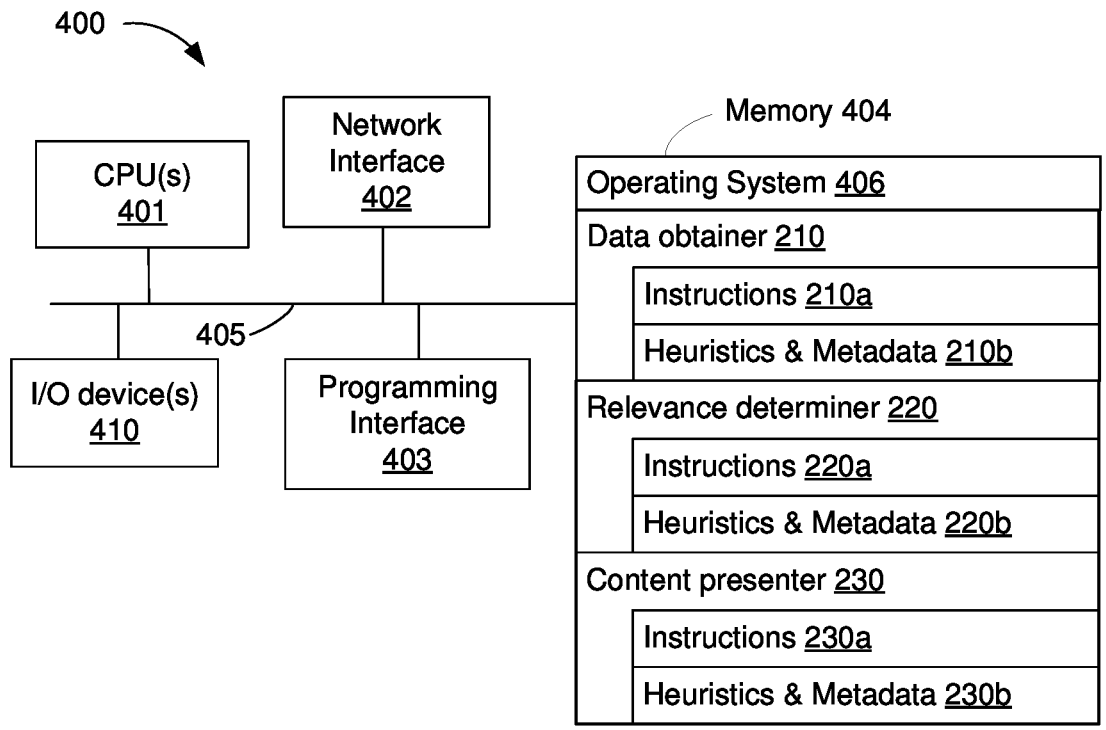
FIG. 4A is a block diagram of a device that performs conversational augmentation in accordance with some implementations.
Figure 4B:
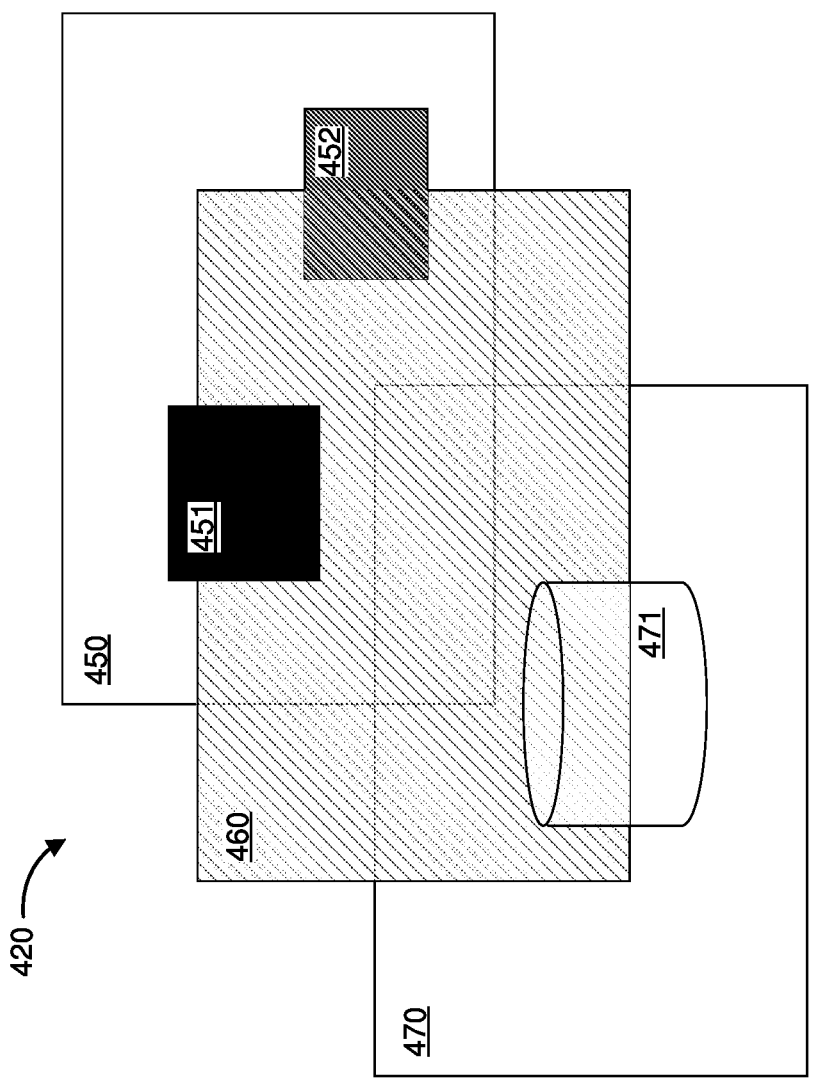
FIG. 4B is a blow-up view of an optical see-through display in accordance with some implementations.

In some implementations, the electronic device 20 includes an optical see-through display (e.g., the optical see-through display 420 shown in FIG. 4B). For example, the electronic device 20 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

In various implementations, the electronic device 20 stores user-curated notes 60. In some implementations, the user-curated notes 60 include notes that the user 30 entered into the electronic device 20. In some implementations, the user-curated notes 60 include text that the user 30 typed (e.g., via a virtual keyboard or a physical keyboard) or dictated via a microphone of the electronic device 20. In some implementations, the user-curated notes 60 include images that the user 30 captured via a camera of the electronic device 20. In some implementations, the user-curated notes 60 include screenshots that the user 30 took when the electronic device 20 was displaying information on a display of the electronic device 20. In some implementations, the user-curated notes 60 include handwritten notes that the user 30 handwrote onto a touchscreen display of the electronic device 20 with a stylus. In some implementations, the user-curated notes 60 include a scanned version of handwritten notes that the user 30 handwrote on physical paper. In some implementations, the user-curated notes 60 include links (e.g., URLs for web pages). In some implementations, the user-curated notes 60 include references to various media content items (e.g., articles, movies, songs or books). In some implementations, the user-curated notes 60 include search results that the electronic device 20 previously presented in response to a search query provided by the user 30 or the person 40.

In some implementations, at least a portion of the user-curated notes 60 include notes that the electronic device 20 automatically generated. In some implementations, the electronic device 20 presents notes that the electronic device 20 generates ("device-generated notes", hereinafter for the sake of brevity), and provides the user 30 an option to approve (e.g., accept) or reject (e.g., discard) various portions of the device-generated notes. In such implementations, the electronic device 20 stores a first portion of the device-generated notes that the user 30 approved as the user-curated notes 60. The electronic device 20 discards a second portion of the device-generated notes that the user 30 rejected. As such, the electronic device 20 forgoes storing the second portion of the device-generated notes as the user-curated notes 60.

In some implementations, the electronic device 20 receives consent from the user 30 to capture audio. After receiving consent to capture audio, the electronic device 20 captures audio via a microphone of the electronic device 20 and transcribes the captured audio in order to generate the device-generated notes. In some implementations, the electronic device 20 receives consent from the user 30 to capture images. After receiving consent to capture images, the electronic device 20 captures images via an image sensor of the electronic device 20, and stores the captured images or a description of the captured images as the device-generated notes.

In some implementations, the electronic device 20 stores the user-curated notes 60 in association with an application that is installed on the electronic device 20. For example, in some implementations, the electronic device 20 stores the user-curated notes 60 as part of a note-taking application (e.g., a notes application) that is installed on the electronic device 20. In various implementations, the note-taking application allows the user 30 of the electronic device 20 to edit the user-curated notes 60. In some implementations, the electronic device 20 stores the user-curated notes 60 as part of a photos application that stores images captured by the electronic device 20. In some implementations, the electronic device 20 stores the user-curated notes 60 as part of a messaging application. In some such implementations, the electronic device 20 stores the user-curated notes 60 in different messaging threads. For example, the electronic device 20 stores the user-curated notes 60 related to previous conversations between the user 30 and the person 40 in a messaging thread between the user 30 and the person 40. In some implementations, if a particular portion of the user-curated notes 60 relates to a previous conversation between multiple people, the electronic device 20 stores that particular portion of the user-curated notes 60 in a group messaging thread between the multiple people.

In some implementations, the electronic device 20 stores the user-curated notes 60 at a remote server. For example, in some implementations, the electronic device 20 stores the user-curated notes 60 in a cloud storage platform. In some implementations, the electronic device 20 stores a portion of the user-curated notes 60 locally and the remainder of the user-curated notes 60 in the cloud storage platform.

In various implementations, the user-curated notes 60 include a first portion 62a, a second portion 62b, a third portion 62c, ..., and an nth portion 62n. In some implementations, each of the portions 62a, 62b, 62c, ..., and 62n correspond to a separate note object (e.g., a separate note file). For example, in some implementations, the first portion 62a is a first note file, the second portion 62b is a second note file, the third portion 62c is a third note file ... and the nth note portion is an nth note file. In some implementations, some of the portions 62a, 62b, 62c, ..., and 62n correspond to different portions (e.g., different pages, paragraphs, sentences or bullet points) of the same note file. For example, in some implementations, the first portion 62a and the second portion 62b are part of the same note file.

In various implementations, the electronic device 20 detects that the user 30 is engaged in a current conversation 50 with the person 40. In some implementations, the electronic device 20 detects that the user 30 is engaged in the current conversation 50 by detecting a first utterance 52a by the user 30 and/or a second utterance 52b by the person 40. The electronic device 20 detects the first utterance 52a and/or the second utterance 52b via an audio sensor (e.g., a microphone). In the example of FIG. 1A, the current conversation 50 is an in-person conversation because the user 30 and the person 40 are collocated in the physical environment 10.

Referring to FIG. 1B, in some implementations, the electronic device 20 detects a reference 54 to a previous conversation in the current conversation 50. In some implementations, the reference 54 includes a phrase that matches a trigger phrase. In some implementations, the trigger phrase is a generic trigger phrase such as "from our last conversation", "when we spoke last", "you may remember", etc. In some implementations, the trigger phrase is a specific trigger phrase that was mentioned in the previous conversation. In some implementations, the previous conversation occurred between the user 30 and the person 40. In some implementations, the previous conversation occurred between the user 30 and another person.

In various implementations, in response to detecting the reference 54, the electronic device 20 determines whether one of the portions 62a, 62b, 62c, ..., and 62n of the user-curated notes 60 is relevant to the current conversation 50. In some implementations, the electronic device 20 generates respective relevance scores for the portions 62a, 62b, 62c, ..., and 62n of the user-curated notes 60. In the example of FIG. 1B, the electronic device 20 generates a first relevance score 64a for the first portion 62a, a second relevance score 64b for the second portion 62b, a third relevance score 64c for the third portion 62c, ..., and an nth relevance score 64n for the nth portion 62n. In some implementations, the relevance scores 64a, 64b, 64c, ..., and 64n indicate how relevant the portions 62a, 62b, 62c, ..., and 62n, respectively, are to the current conversation 50.

In various implementations, the electronic device 20 compares the relevance scores 64a, 64b, 64c, ..., and 64n with a relevance threshold 66 to determine whether the portions 62a, 62b, 62c, ..., and 62n are relevant to the current conversation 50. In some implementations, the electronic device 20 determines that a particular portion of the user-curated notes 60 is relevant to the current conversation 50 when the relevance score for that particular portion satisfies (e.g., exceeds) the relevance threshold 66. In the example of FIG. 1B, the electronic device 20 determines that the second portion 62b is relevant to the current conversation 50, for example, because the second relevance score 64b is greater than the relevance threshold 66.

In some implementations, there are multiple portions of the user-curated notes 60 that satisfy the relevance threshold 66. In some such implementations, the electronic device 20 selects the portion of the user-curated notes 60 that is most relevant (e.g., the portion of the user-curated notes 60 with the highest relevance score). Alternatively, in some implementations, the electronic device 20 presents multiple portions of the user-curated notes 60 that satisfy the relevance threshold 66 (e.g., the electronic device 20 concurrently or sequentially presents each portion of the user-curated notes 60 that satisfies the relevance threshold 66).

In some implementations, the electronic device 20 determines that a particular portion of the user-curated notes 60 is not relevant to the current conversation 50 when the relevance score for that particular portion breaches (e.g., is less than) the relevance threshold 66. In the example of FIG. 1B, the electronic device 20 determines that the first portion 62a, the third portion 62c, ..., and the nth portion 62n are not relevant to the current conversation 50, for example, because the first relevance score 64a, the third relevance score 64c, ..., and the nth relevance score 64n are less than the relevance threshold 66.

In some implementations, the electronic device 20 determines the relevance scores 64a, 64b, 64c, ..., and 64n based on whether the portions 62a, 62b, 62c, ..., and 62n provide information regarding a subject (e.g., a topic) being discussed in the current conversation 50. In such implementations, if a particular portion of the user-curated notes 60 provides the information regarding the subject being discussed in the current conversation 50, then the electronic device 20 assigns that particular portion a relevance score that is greater than the relevance threshold 66. By contrast, if the particular portion of the user-curated notes 60 does not provide information regarding the subject being discussed in the current conversation 50, then the electronic device 20 assigns that particular portion a relevance score that is less than the relevance threshold 66. In the example of FIG. 1B, the electronic device 20 determines that the second portion 62b provides information regarding the subject being discussed in the current conversation 50, whereas the remaining portions do not provide information regarding the subject being discussed in the current conversation 50. In some implementations, the subject being discussed in the current conversation 50 is a person that is not part of the current conversation 50. In some implementations, the subject being discussed in the current conversation 50 is information provided by an entity that is not part of the current conversation 50.

In some implementations, the electronic device 20 determines the relevance scores 64a, 64b, 64c, ..., and 64n based on whether the portions 62a, 62b, 62c, ..., and 62n provide information that is being requested in the current conversation 50. In such implementations, if a particular portion of the user-curated notes 60 provides the information that is being requested in the current conversation 50, then the electronic device 20 assigns that particular portion a relevance score that is greater than the relevance threshold 66. By contrast, if the particular portion of the user-curated notes 60 does not provide the information that is being requested in the current conversation 50, then the electronic device 20 assigns that particular portion a relevance score that is less than the relevance threshold 66. In the example of FIG. 1B, the electronic device 20 determines that the second portion 62b provides the information that is being requested in the current conversation 50, whereas the remaining portions do not provide the information that is being requested in the current conversation 50.

In some implementations, the electronic device 20 determines the relevance scores 64a, 64b, 64c, ..., and 64n based on whether the portions 62a, 62b, 62c, ..., and 62n provide information that is related to the person 40. In such implementations, if a particular portion of the user-curated notes 60 provides information that is related to the person 40, then the electronic device 20 assigns that particular portion a relevance score that is greater than the relevance threshold 66. By contrast, if the particular portion of the user-curated notes 60 does not provide information that is related to the person, then the electronic device 20 assigns that particular portion a relevance score that is less than the relevance threshold 66. In the example of FIG. 1B, the electronic device 20 determines that the second portion 62b is related to the person 40, whereas the remaining portions do not provide information that is related to the person 40.

In some implementations, the electronic device 20 determines the relevance scores 64a, 64b, 64c, ..., and 64n based on whether the portions 62a, 62b, 62c, ..., and 62n provide an answer to a question being asked in the current conversation 50. In such implementations, if a particular portion of the user-curated notes 60 provides an answer to the question being asked in the current conversation 50, then the electronic device 20 assigns that particular portion a relevance score that is greater than the relevance threshold 66. By contrast, if the particular portion of the user-curated notes 60 does not provide the answer to the question being asked in the current conversation 50, then the electronic device 20 assigns that particular portion a relevance score that is less than the relevance threshold 66. In the example of FIG. 1B, the electronic device 20 determines that the second portion 62b provides an answer to a question being asked in the current conversation 50, whereas the remaining portions do not provide an answer to the question being asked in the current conversation 50. In some implementations, the electronic device 20 includes a neural network system that receives the question and the user-curated notes 60 as inputs, and outputs an indication as to whether a portion of the user-curated notes 60 includes an answer to the question.

Figure 1C:
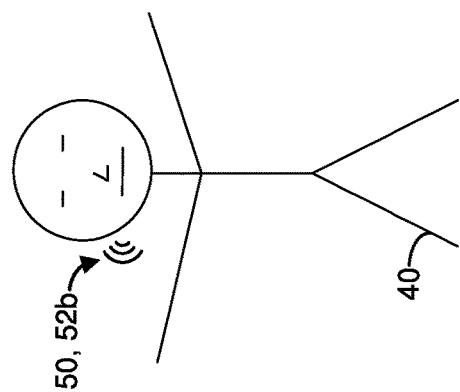
Figure 1C:
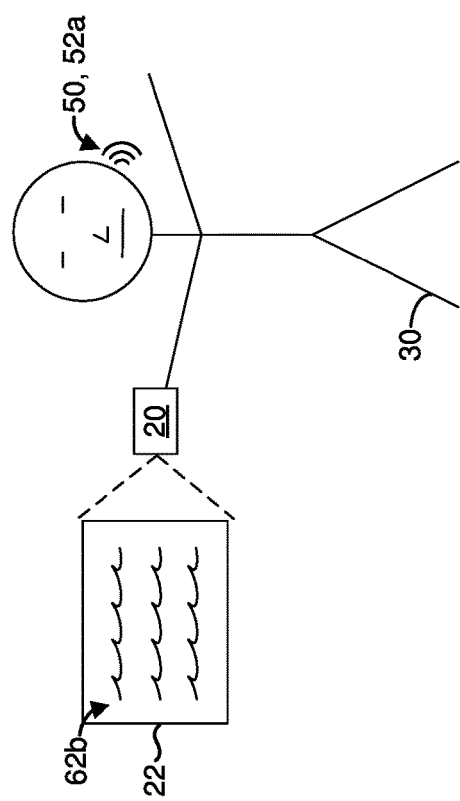

Referring to FIG. 1C, the electronic device 20 displays the second portion 62b on a display 22 of the electronic device 20. Since the electronic device 20 automatically displays the second portion 62b of the user-curated notes 60, the user 30 does not have to perform a search or scroll through the user-curated notes 60 to find the second portion 62b of the user-curated notes 60. As such, the user 30 can stay engaged in the current conversation 50 without having to unnecessarily interact with the electronic device 20. Hence, automatically presenting the second portion 62b that is relevant to the current conversation 50 enhances a user experience of the electronic device 20. Automatically presenting the second portion 62b of the current conversation 50 improves operability of the electronic device 20 by decreasing a power consumption of the electronic device 20, for example, by reducing the need for user inputs that correspond to performing a search or scrolling through the user-curated notes 60 to find the second portion 62b.

In some implementations, the electronic device 20 displays a visual representation (e.g., an avatar) of a virtual agent (e.g., a virtual assistant). In such implementations, the visual representation of the virtual agent conveys the second portion 62b of the user-curated notes 60. For example, the visual representation of the virtual agent outputs the second portion 62b of the user-curated notes 60 in order to provide an appearance that the visual representation of the virtual agent is speaking the information included in the second portion 62b of the user-curated notes 60. In some implementations, the electronic device 20 triggers the visual representation of the virtual agent to output the second portion 62b of the user-curated notes 60 when the electronic device 20 detects that the user 30 is looking towards the visual representation of the virtual agent or when the user 30 activates the visual representation of the virtual agent.

Figure 1D:
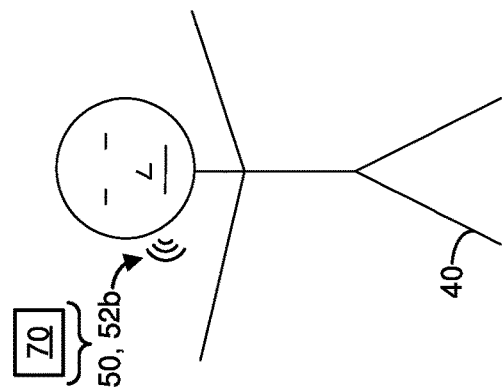
Figure 1D:
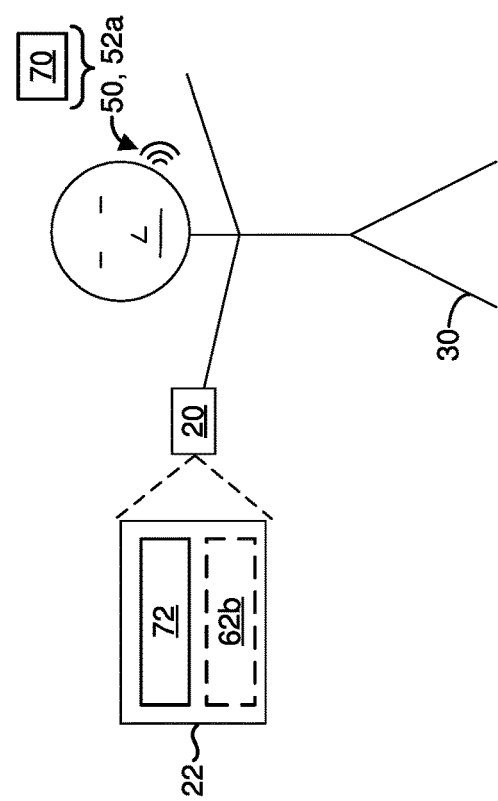

Referring to FIG. 1D, in some implementations, the electronic device 20 detects that a question 70 is being asked in the current conversation 50. In some implementations, the electronic device 20 detects that the user 30 is asking the question 70. Additionally or alternatively, in some implementations, the electronic device 20 detects that the person 40 is asking the question 70. As discussed in relation to FIG. 1B, in some implementations, the electronic device 20 determines that the second portion 62b of the user-curated notes 60 includes an answer 72 to the question 70. As such, the electronic device 20 presents the answer 72 to the question 70. In some implementations, the electronic device 20 synthesizes (e.g., generates) the answer 72 to the question 70 based on the information provided by the second portion 62b of the user-curated notes 60. In such implementations, the electronic device 20 displays a portion of the second portion 62b that the electronic device 20 used to generate the answer 72 to the question 70. In some implementations, the electronic device 20 includes a neural network system that receives the question 70 and the user-curated notes 60 as inputs, and outputs the answer 72.

Figure 1E:
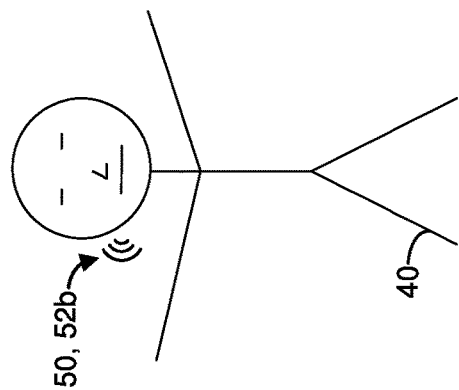
Figure 1E:
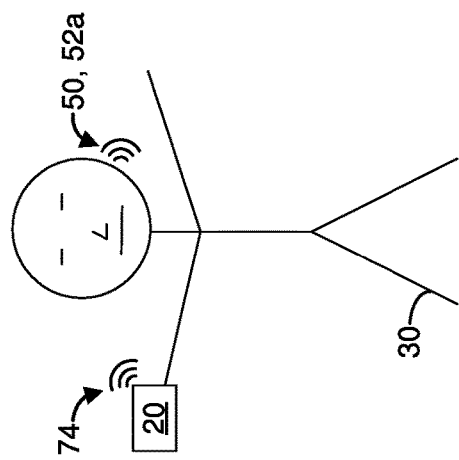

Referring to FIG. 1E, in some implementations, the electronic device 20 outputs (e.g., plays) audio 74 corresponding to the second portion 62b of the user-curated notes 60. In some implementations, the electronic device 20 converts text of the second portion 62b into the audio 74. In some implementations, the electronic device 20 plays the audio 74 instead of displaying the second portion 62b, for example, when the user 30 is not available to view the display 22 of the electronic device 20 (e.g., when the user 30 is driving).

Figure 1F:
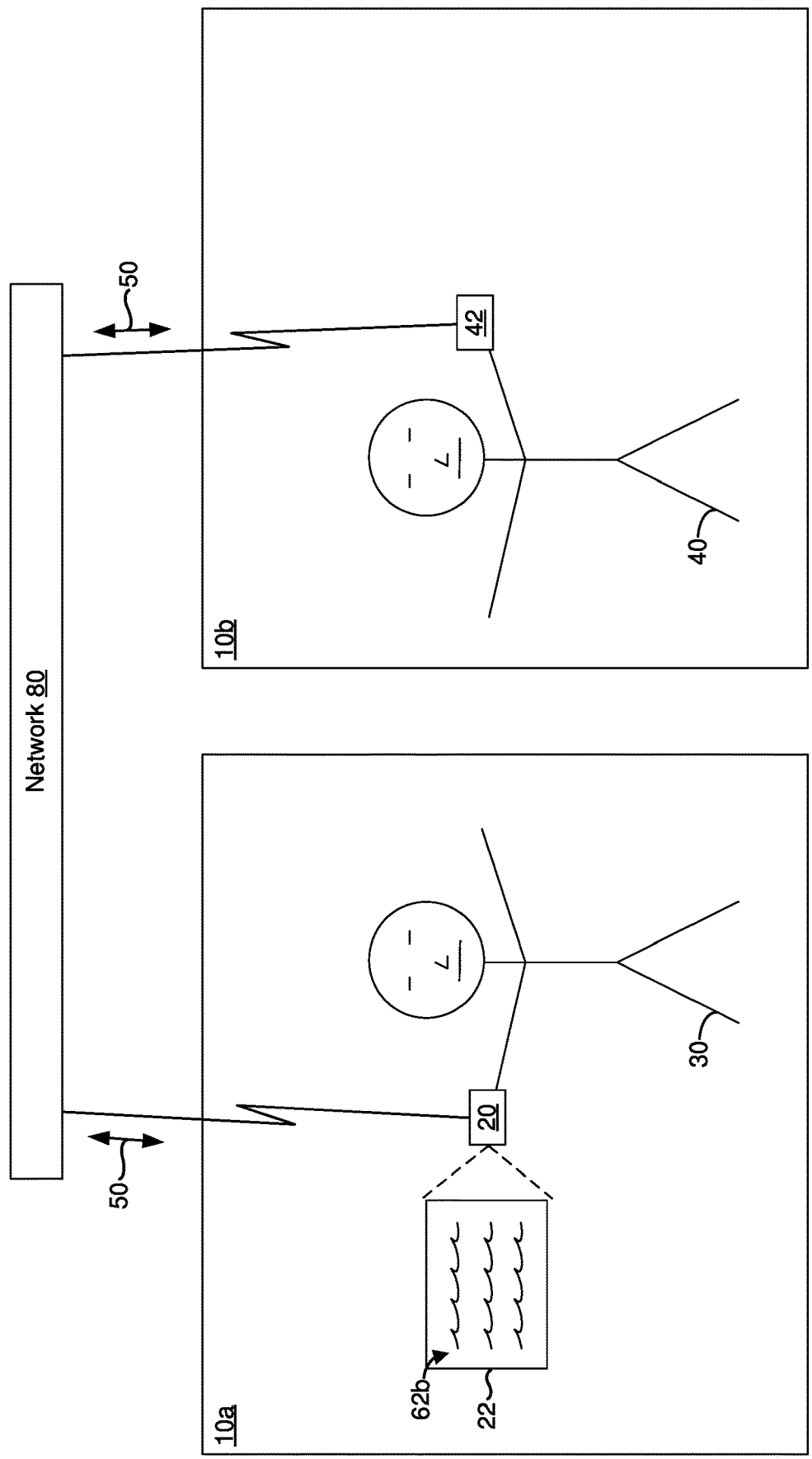

Referring to FIG. 1F, in some implementations, the user 30 is in a first physical environment 10a and the person 40 is in a second physical environment 10b that is different from the first physical environment 10a. The person 40 is using an electronic device 42 (e.g., a handheld computing device such as a smartphone or a tablet, or a wearable computing device such as an HMD or an electronic watch). The electronic devices 20 and 42 are communicating with each other via a network 80 (e.g., a portion of the Internet). In some implementations, the current conversation 50 is a phone conversation between the user 30 and the person 40. In some implementations, the user 30 and the person 40 are communicating via an instant messaging (IM) session, and the current conversation 50 is an IM chat. In some implementations, the user 30 and the person 40 are in a video conferencing session, and the current conversation 50 is a video chat.

As illustrated in FIG. 1F, the electronic device 20 displays the second portion 62b of the user-curated notes 60 on the display 22 of the electronic device 20 in response to determining that the second portion 62b is relevant to the current conversation 50 between the user 30 and the person 40. More generally, in various implementations, the electronic device 20 displays the second portion 62b of the user-curated notes 60 in response to determining that the second portion 62b of the user-curated notes 60 is relevant to an electronic communication (e.g., a phone call, a video chat, an IM chat, an email thread, or a conversation occurring over a social networking platform) between the electronic device 20 and the electronic device 42.

Figure 1G:
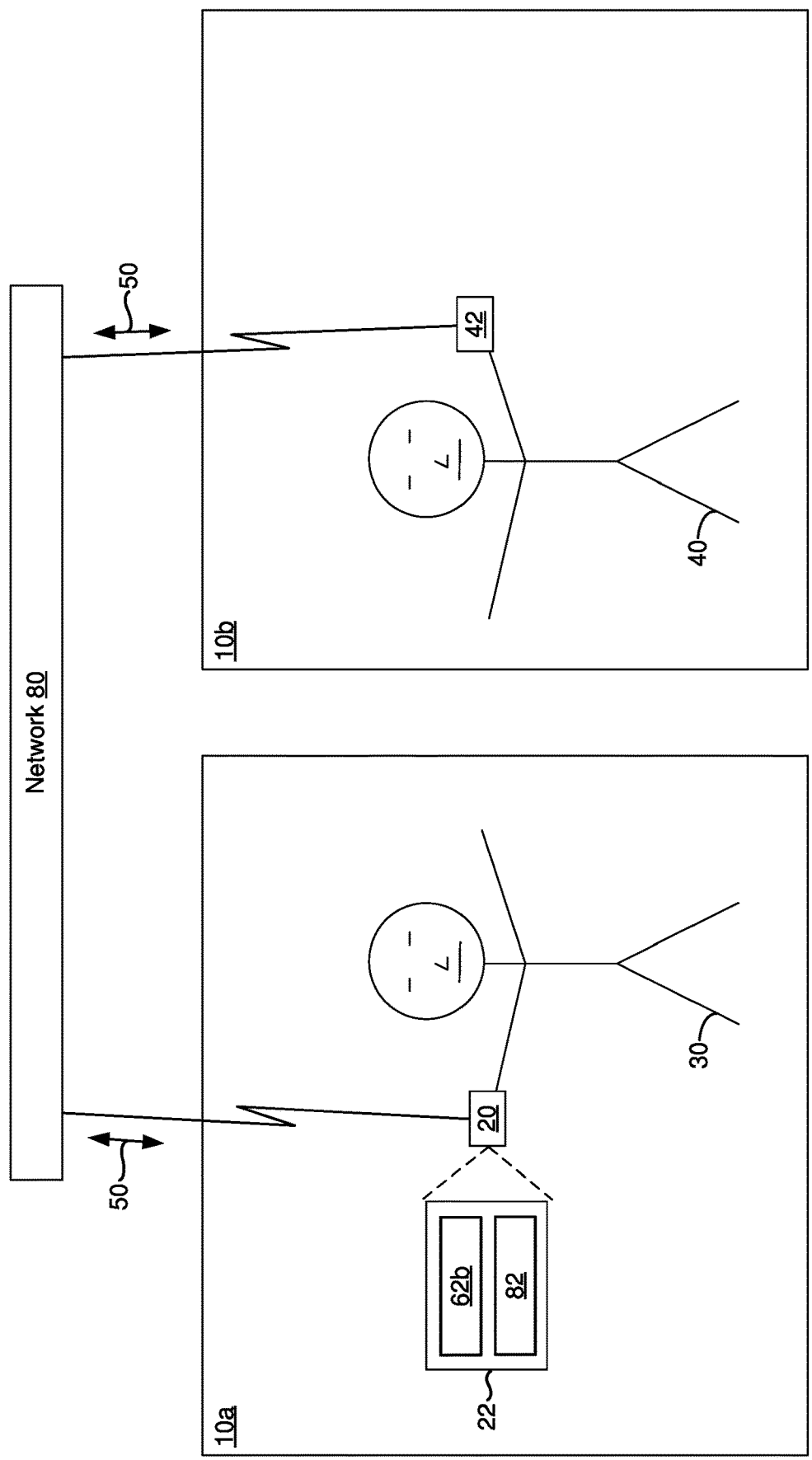
Figure 1H:
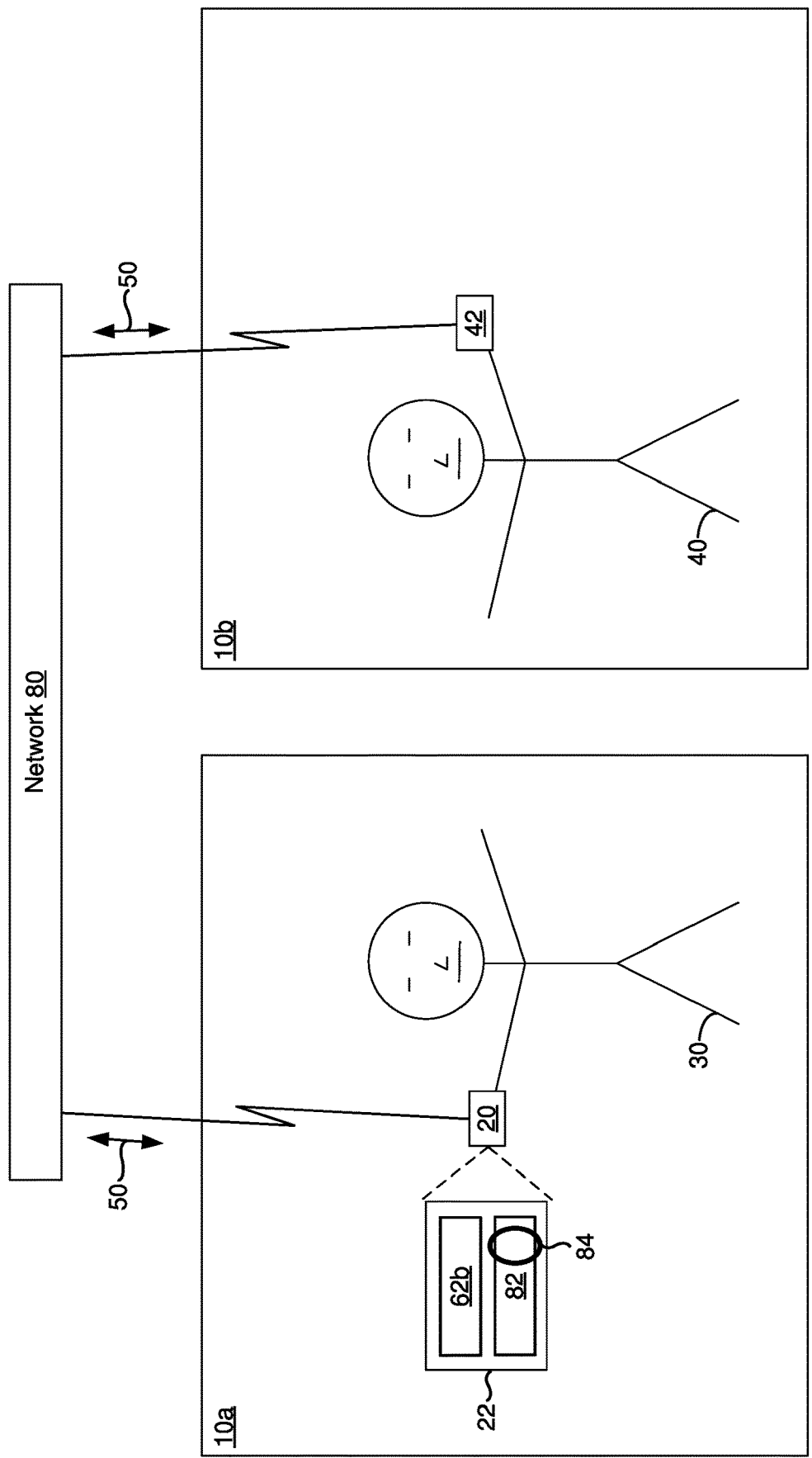
Figure 1I:
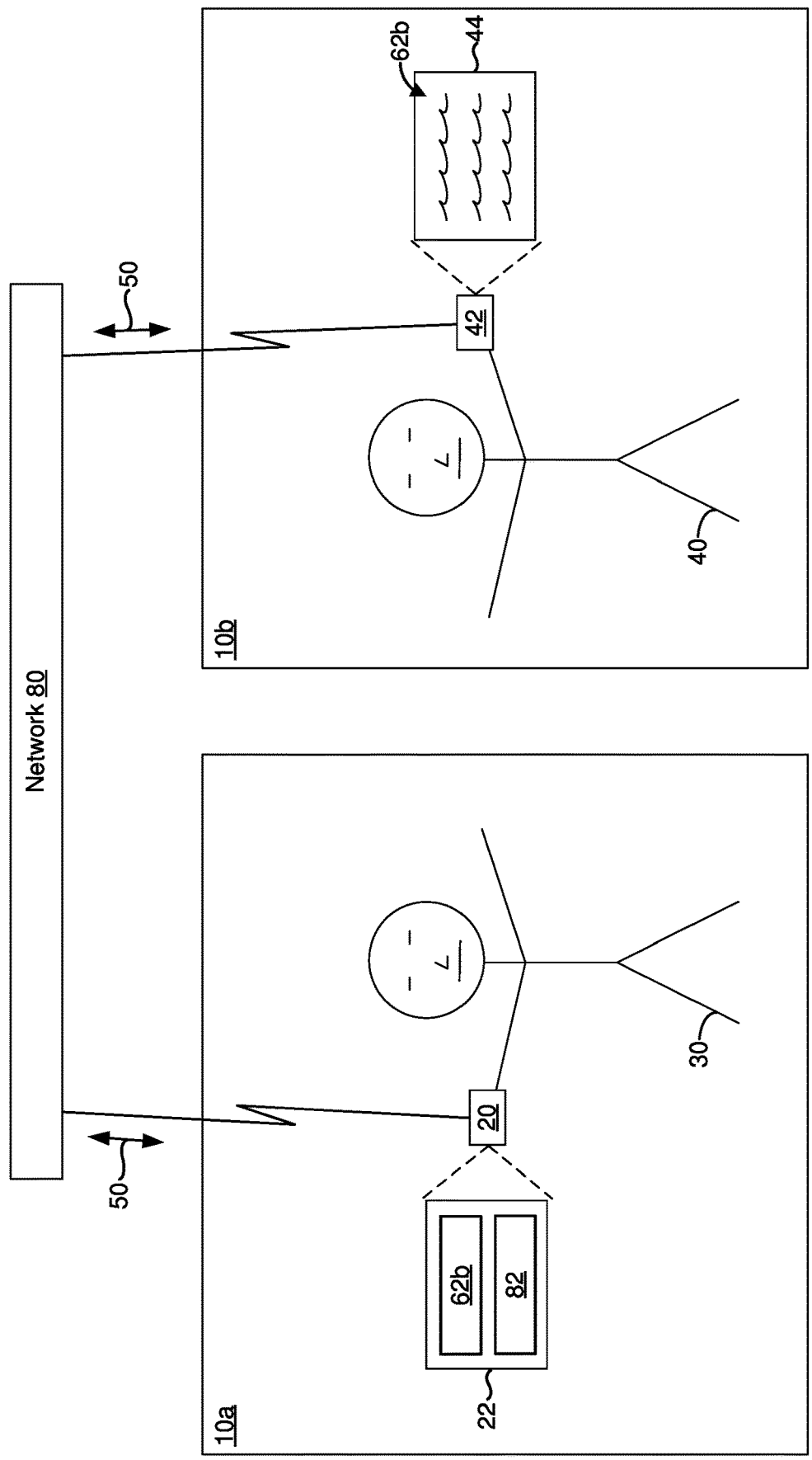

Referring to FIG. 1G, in some implementations, the electronic device 20 displays a share affordance 82 that allows the user 30 to share portions of the user-curated notes 60 that are relevant to the current conversation 50. In the example of FIG. 1G, the share affordance 82 allows the user 30 to share the second portion 62b of the user-curated notes 60 with the person 40. FIG. 1H illustrates a user input 84 at a location corresponding to the share affordance 82. For example, the user 30 taps on the share affordance 82. In response to detecting the user input 84, the electronic device 20 sends the second portion 62b of the user-curated notes 60 to the electronic device 42. As shown in FIG. 1I, the electronic device 42 displays the second portion 62b of the user-curated notes 60 on a display 44 of the electronic device 42.

In some implementations, the electronic device 20 includes an HMD that is worn by the user 30. In some implementations, the HMD presents (e.g., displays) an XR environment according to various implementations. In such implementations, the HMD displays a portion of the user-curated notes 60 that are relevant to the current conversation 50 (e.g., the second portion 62b of the user-curated notes 60) in the XR environment. In some implementations, the HMD includes an integrated display (e.g., a built-in display, for example, a built-in optical see-through display or a built-in opaque display) that displays the XR environment including the relevant portion of the user-curated notes 60. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the XR environment including the relevant portion of the user-curated notes 60. In various implementations, examples of the electronic device 20 include smartphones, tablets, media players, laptops, etc.

Figure 2:
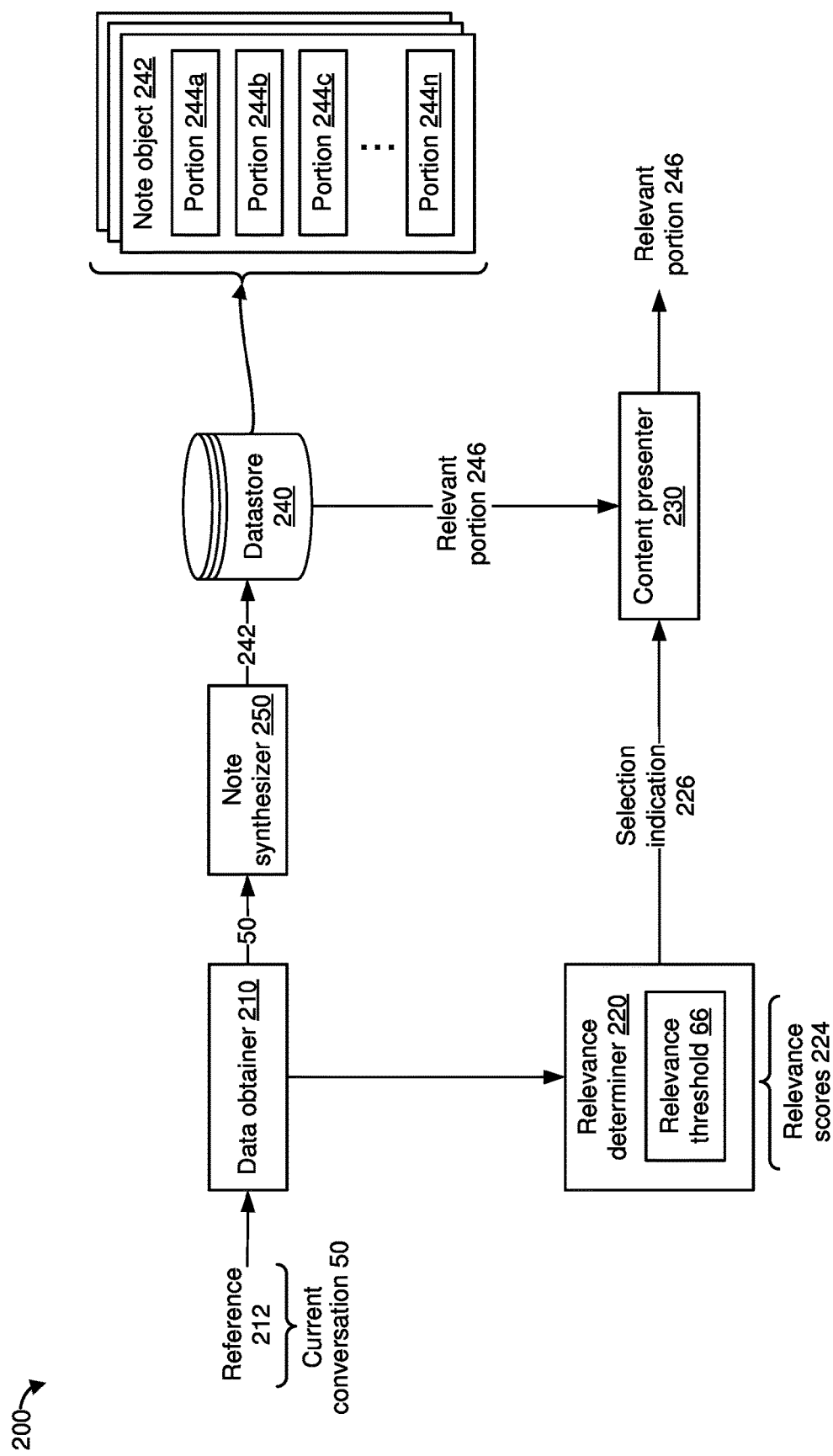
FIG. 2 is a block diagram of a conversational augmentation system in accordance with some implementations.

FIG. 2 is a block diagram of a conversational augmentation system 200 in accordance with some implementations. In some implementations, the conversation augmentation system 200 resides at (e.g., is implemented by) the electronic device 20 shown in FIGS. 1A-1I. In some implementations, the electronic device 20 (shown in FIGS. 1A-1I) includes the conversational augmentation system 200. In various implementations, the conversational augmentation system 200 includes a data obtainer 210, a relevance determiner 220, a content presenter 230 and a datastore 240.

In various implementations, the datastore 240 stores user-curated notes (e.g., the user-curated notes 60 shown in FIGS. 1A and 1B) as a set of one or more note objects 242. In some implementations, each note object 242 includes an electronic file (e.g., an electronic document). In some implementations, each note object 242 includes various portions, for example, a first portion 244a, a second portion 244b, a third portion 244c, . . . , and an nth portion 244n. In some implementations, portions 244a, 244b, 244c, . . . , and 244n are similar to the portions 62a, 62b, 62c, . . . , and 62n shown in FIGS. 1A and 1B. In some implementations, the portions 244a, 244b, 244c, . . . , and 244n correspond to different sections, pages, paragraphs, sentences, bullet points or phrases in a note object 242.

In various implementations, the data obtainer 210 detects a reference 212 to a previous conversation (e.g., the reference 54 shown in FIG. 1B). In some implementations, the reference 212 includes a phrase that matches a trigger phrase. In some implementations, the reference 212 includes a generic trigger phrase such as "from our last conversation", "when we spoke last", "you may remember", etc. In some implementations, the reference 212 includes a specific trigger phrase that was mentioned in the previous conversation. In various implementations, the data obtainer 210 detects the reference 212 by monitoring the current conversation 50. In some implementations, the data obtainer 210 monitors the current conversation 50 after receiving consent from a user of the conversational augmentation system 200 (e.g., from the user 30 shown in FIGS. 1A-1I).

In various implementations, in response to the data obtainer 210 detecting the reference 212, the relevance determiner 220 determines whether the datastore 240 stores user-curated notes that are relevant to the current conversation 50. For example, in some implementations, the relevance determiner 220 determines whether one or more of the portions 244a, 244b, 244c, . . . , and 244n of the note object 242 is relevant to the current conversation 50. In some implementations, the relevance determiner 220 generates respective relevance scores 224 (e.g., the relevance scores 64a, 64b, 64c, . . . , and 64n shown in FIG. 1B) for the portions 244a, 244b, 244c, . . . , and 244n of the note object 242.

In various implementations, the relevance determiner 220 compares the relevance scores 224 with the relevance threshold 66 to determine whether the portions 244a. 244b, 244c, . . . , and 244n are relevant to the current conversation 50. In some implementations, the relevance determiner 220 determines that a particular portion of the note object(s) 242 is relevant to the current conversation 50 when the relevance score for that particular portion satisfies (e.g., exceeds) the relevance threshold 66. In such implementations, the relevance determiner 220 provides a selection indication 226 to the content presenter 230 indicating one or more portions of the note object(s) 242 that are relevant to the current conversation 50 ("relevant portion 246", hereinafter for the sake of brevity).

In various implementations, the relevance determiner 220 includes a neural network system that receives at least a portion of the current conversation 50 as an input, and outputs the selection indication 226 indicating the relevant portion 246. In some implementations, the neural network system receives a portion of the current conversation 50 that occurs within a temporal window that encompasses a time at which the reference 212 is detected. For example, the neural network system receives a portion of the current conversation 50 that occurs thirty seconds prior to detecting the reference 212 and/or a portion of the current conversation 50 that occurs sixty seconds after detecting the reference 212.

In various implementations, the content presenter 230 obtains the relevant portion 246 indicated by the selection indication 226 and causes presentation of the relevant portion 246. For example, in some implementations, the content presenter 230 retrieves the relevant portion 246 from the datastore 240 and presents the relevant portion 246 on a display (e.g., the display 22 shown in FIG. 1C). In some implementations, the content presenter 230 outputs audio corresponding to the relevant portion 246. For example, the content presenter 230 converts the relevant portion 246 from text to speech and outputs the speech via a speaker (e.g., as illustrated in FIG. 1E).

In some implementations, the content presenter 230 determines a presentation mode for the relevant portion 246 based on a conversational mode of the current conversation 50. In some implementations, the content presenter 230 selects the presentation mode for the relevant portion 246 such that the presentation mode for the relevant portion 246 is the same as the conversational mode of the current conversation 50. For example, if the conversational mode of the current conversation 50 is audible speech (e.g., an in-person conversation or a telephonic conversation), then the content presenter 230 outputs audio corresponding to the relevant portion 246. In some implementations, the content presenter 230 selects a presentation mode for the relevant portion 246 that is different from the conversational mode of the current conversation 50. For example, if the conversational mode of the current conversation 50 is audible speech (e.g., an in-person conversation or a telephonic conversation), then the content presenter 230 displays text or an image corresponding to the relevant portion 246.

Since the content presenter 230 automatically presents the relevant portion 246 of the note object(s) 242, a user (e.g., the user 30 shown in FIGS. 1A-1I) does not have to perform a search or scroll through the note object(s) 242 to locate the relevant portion 246 of the note object(s) 242. As such, the user can stay engaged in the current conversation 50 without having to unnecessarily interact with a user interface. Hence, automatically presenting the relevant portion 246 that is relevant to the current conversation 50 enhances a user experience of a device that implements the conversation augmentation system 200 (e.g., the electronic device 20 shown in FIGS. 1A-1I). Automatically presenting the relevant portion 246 of the note object(s) 242 improves operability of a device that includes the conversation augmentation system 200 (e.g., the electronic device 20 shown in FIGS. 1A-1I), for example, by reducing the need for user inputs that correspond to performing a search or scrolling through the note object(s) 242 to find the relevant portion 246.

In some implementations, the relevance determiner 220 determines that a particular portion of the note object(s) 242 is not relevant to the current conversation 50 when the relevance score 224 for that particular portion breaches (e.g., is less than) the relevance threshold 66. As such, in some implementations, the content presenter 230 does not present portions of the note object(s) 242 with relevance scores 224 that are less than the relevance threshold 66.

In some implementations, the relevance scores 224 indicate whether the corresponding portions of the note object(s) 242 provide information regarding a subject (e.g., a topic) being discussed in the current conversation 50. In such implementations, if a particular portion of the note object(s) 242 provides information regarding the subject being discussed in the current conversation 50, then the relevance determiner 220 assigns that particular portion a relevance score 224 that is greater than the relevance threshold 66. As such, in some implementations, the content presenter 230 presents a portion of the note object(s) 242 that provides information regarding a subject being discussed in the current conversation 50. By contrast, if a particular portion of the note object(s) 242 does not provide information regarding the subject being discussed in the current conversation 50, then the relevance determiner 220 assigns that particular portion a relevance score 224 that is less than the relevance threshold 66. As such, in some implementations, the content presenter 230 forgoes presenting portions of the note object(s) 242 that do not provide information regarding a subject being discussed in the current conversation 50.

In some implementations, the relevance scores 224 indicate whether the corresponding portions of the note object(s) 242 provide information that is being requested in the current conversation 50. In such implementations, if a particular portion of the note object(s) 242 provides information that is being requested in the current conversation 50, then the relevance determiner 220 assigns that particular portion a relevance score 224 that is greater than the relevance threshold 66. As such, in some implementations, the content presenter 230 presents a portion of the note object(s) 242 that provides information that is being requested in the current conversation 50. By contrast, if a particular portion of the note object(s) 242 does not provide the information that is being requested in the current conversation 50, then the relevance determiner 220 assigns that particular portion a relevance score that is less than the relevance threshold 66. As such, in some implementations, the content presenter 230 forgoes presenting portions of the note object(s) that do not provide information that is being requested in the current conversation 50.

In some implementations, the relevance scores 224 indicate whether the corresponding portions of the note object(s) 242 provide an answer to a question being asked in the current conversation 50. In such implementations, if a particular portion of the note object(s) 242 provides an answer to a question being asked in the current conversation 50, then the relevance determiner 220 assigns that particular portion a relevance score that is greater than the relevance threshold 66. As such, in some implementations, the content presenter 230 presents a portion of the note object(s) 242 that provides an answer to a question being asked in the current conversation 50. By contrast, if a particular portion of the note object(s) 242 does not provide an answer to a question being asked in the current conversation 50, then the relevance determiner 220 assigns that particular portion a relevance score that is less than the relevance threshold 66. As such, in some implementations, the content presenter 230 forgoes presenting portions of the note object(s) 242 that do not provide an answer to a question being asked in the current conversation 50. In some implementations, a neural network system receives a question being asked in the current conversation 50 as an input, and outputs an indication of a portion of the note object(s) 242 that provides an answer to the question.

In some implementations, the reference 212 includes a question that is being asked in the current conversation 50 (e.g., the question 70 shown in FIG. 1D). In such implementations, the content presenter 230 utilizes information provided by the relevant portion 246 to synthesize an answer to the question being asked in the current conversation 50 (e.g., the content presenter 230 synthesizes the answer 72 shown in FIG. 1D). The content presenter 230 presents the answer. In some implementations, the content presenter 230 indicates which part of the relevant portion 246 the content presenter 230 utilized to generate the answer to the question.

In some implementations, the conversation augmentation system 200 includes a note synthesizer 250 that generates at least some of the note object(s) 242 stored in the datastore 240. In some implementations, the note synthesizer 250 generates some of the note object(s) 242 by monitoring the current conversation 50 after receiving consent from a user (e.g., the user 30 shown in FIGS. 1A-1I). In some implementations, the note synthesizer 250 synthesizes notes regarding the current conversation 50 by generating a transcript of the current conversation 50. In some implementations, the note synthesizer 250 synthesizes notes regarding the current conversation 50 by performing semantic analysis on the current conversation 50. In some implementations, the note synthesizer 250 provides the user an option to reject or approve portions of the notes that the note synthesizer 250 generates. In such implementations, the note synthesizer 250 stores portions of the notes that the user approved in the datastore 240, and the note synthesizer 250 discards portions of the notes that the user rejected.

Figure 3:
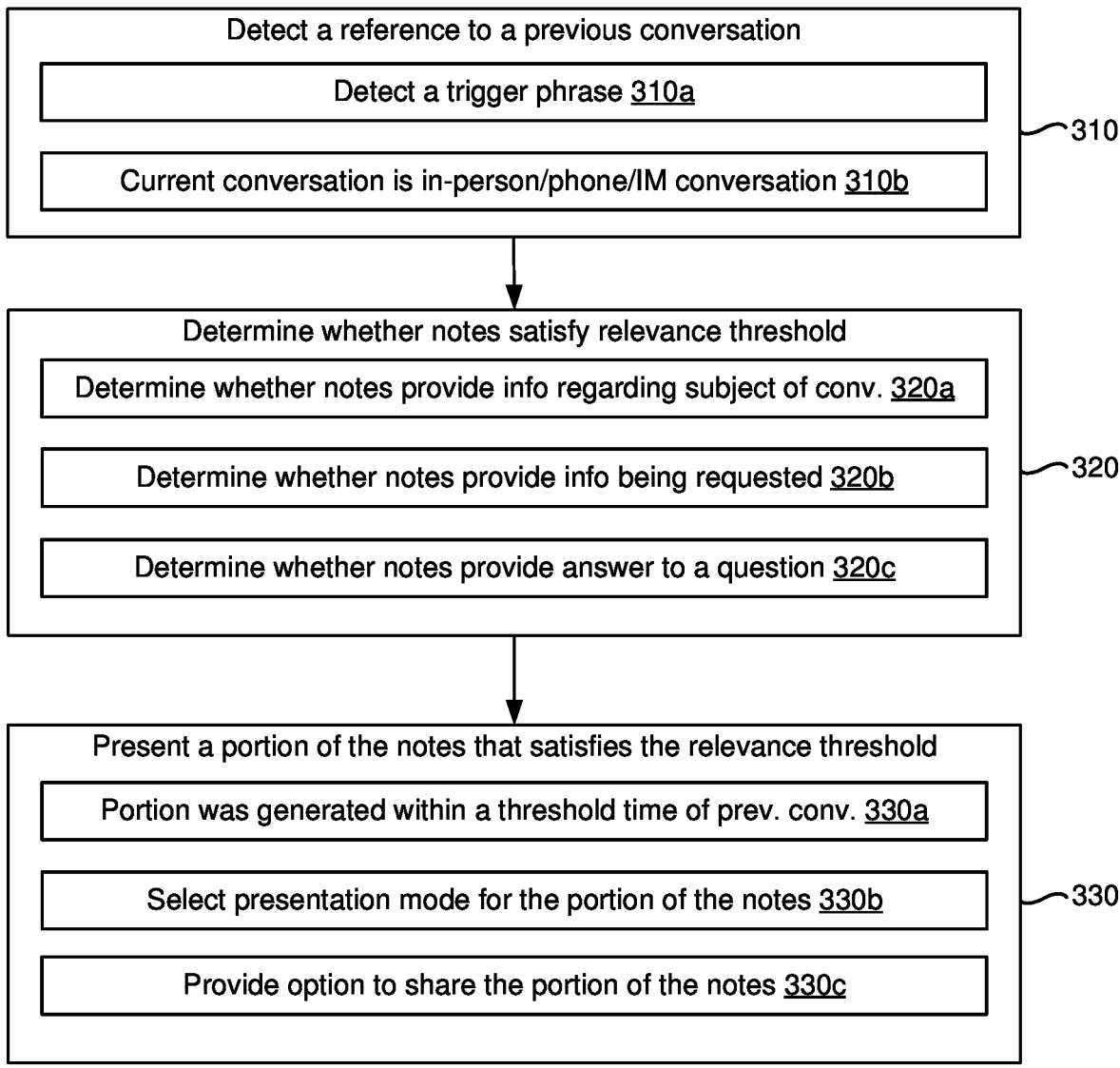
FIG. 3 is a flowchart representation of a method of augmenting a conversation in accordance with some implementations.

FIG. 3 is a flowchart representation of a method 300 of augmenting a conversation. In various implementations, the method 300 is performed by a device with a display (e.g., an optical see-through display, for example, the optical see-through display 420 shown in FIG. 4B), a non-transitory memory and one or more processors coupled with the display and the non-transitory memory (e.g., the electronic device 20 shown in FIGS. 1A-1I, and/or the conversation augmentation system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes, while a user of the device is in a current conversation with a person, detecting a reference to a previous conversation. For example, as shown in FIG. 1B, the electronic device 20 detects the reference 54 in the current conversation 50.

As represented by block 310a, in some implementations, detecting the reference includes detecting a phrase in the current conversation that matches a set of one or more trigger phrases. In some implementations, a trigger phrase includes a general reference to a previous conversation (e.g., "from our last conversation, "we spoke about this earlier", etc.).

In some implementations, detecting the reference includes detecting a phrase in the current conversation that matches a particular phrase from the previous conversation. In some implementations, the method 300 includes detecting a specific reference to a particular previous conversation, for example, instead of or in addition to detecting a general reference to a previous conversation. For example, in some implementations, the method 300 includes detecting, in the current conversation, a name of a project that was discussed during a particular previous conversation.

As represented by block 310b, in some implementations, the current conversation is an in-person conversation. For example, in some implementations, the user and the person are in the same physical environment (e.g., as shown in FIGS. 1A-1E, the user 30 and the person 40 are in the physical environment 10). In some implementations, the current conversation is a phone conversation. For example, in some implementations, the user and the person are in different physical environments, and the user and the person are conversing over the phone (e.g., as shown in FIGS. 1F-1I, the user 30 is in the first physical environment 10a and the person 40 is in the second physical environment 10b). In some implementations, the current conversation includes a messaging session. In some implementations, the current conversation includes a set of messages being exchanged between respective devices of the user and the person. For example, in some implementations, the current conversation is occurring via an instant messaging application, a social network application, or an email application.

As represented by block 320, in some implementations, the method 300 includes determining whether there are user-curated notes that satisfy a relevance threshold associated with the current conversation. For example, as discussed in relation to FIG. 1B, in some implementations, the electronic device 20 determines whether the portions 62a, 62b, 62c, . . . , and 62n of the user-curated notes 60 are relevant to the current conversation 50. In some implementations, the method 300 includes generating relevance scores for respective portions of the user-curated notes. For example, as discussed in relation to FIG. 2, in some implementations, the relevance determiner 220 determines the relevance scores 224 for respective portions of the note object(s) 242.

As represented by block 320*a*, in some implementations, the method 300 includes determining whether the user-curated notes provide information regarding a subject of the current conversation. For example, if the subject of the current conversation is releasing a product, then the device determines whether the user-curated notes provide information regarding releasing the product (e.g., potential release dates for the product, potential geographical regions in which the product will be released, etc.). In some implementations, the method 300 includes assigning relevance scores to portions of the user-curated notes based on whether or not the portions provide information regarding the subject. In some implementations, the method 300 includes assigning relevance scores that are greater than a relevance threshold (e.g., the relevance threshold 66 shown in FIGS. 1B and 2) to portions of the user-curated notes that provide information regarding a subject being discussed in the current conversation. In some implementations, the method 300 includes assigning relevance scores that are less than the relevance threshold to portions of the user-curated notes that do not provide information regarding the subject being discussed in the current conversation.

As represented by block 320*b*, in some implementations, the method 300 includes determining whether the user-curated notes provide information that is being requested or sought in the current conversation. In some implementations, the method 300 includes determining whether the user-curated notes provide information that is being requested by the user of the device. In some implementations, the method 300 includes determining whether the user-curated notes provide information that is being requested by the person that the user is conversing with. In some implementations, the method 300 includes assigning relevance scores to portions of the user-curated notes based on whether or not the portions provide information that is being requested or sought. In some implementations, the method 300 includes assigning relevance scores that are greater than a relevance threshold (e.g., the relevance threshold 66 shown in FIGS. 1B and 2) to portions of the user-curated notes that provide information that is being requested or sought in the current conversation. In some implementations, the method 300 includes assigning relevance scores that are less than the relevance threshold to portions of the user-curated notes that do not provide information that is being requested or sought in the current conversation.

As represented by block 320*c*, in some implementations, the method 300 includes determining whether the user-curated notes provide an answer to a question being asked in the current conversation. In some implementations, the method 300 includes determining whether the user-curated notes provide information that the device can utilize to generate an answer to the question being asked in the current conversation. In some implementations, the method 300 includes determining whether the user-curated notes provide an answer to a question that the user asks. In some implementations, the method 300 includes determining whether the user-curated notes provide an answer to a question that the person with whom the user is conversing asks. In some implementations, the method 300 includes assigning relevance scores to portions of the user-curated notes based on whether or not the portions include an answer to a question being asked in the current conversation. In some implementations, the method 300 includes assigning relevance scores that are greater than a relevance threshold (e.g., the relevance threshold 66 shown in FIGS. 1B and 2) to portions of the user-curated notes that provide an answer to a question being asked in the current conversation. In some implementations, the method 300 includes assigning relevance scores that are less than the relevance threshold to portions of the user-curated notes that do not provide an answer to a question being asked in the current conversation.

In some implementations, the method 300 includes providing at least a portion of the current conversation as an input to a neural network system, and receiving as an output of the neural network system an indication of a portion of the user-curated notes that are relevant to the current conversation. In some implementations, the method 300 includes providing as an input to the neural network system a portion of the current conversation that includes the reference to the previous conversation. For example, in some implementations, the method 300 includes providing as an input to the neural network system the last thirty seconds of the current conversation.

As represented by block 330, in some implementations, the method 300 includes presenting a portion of the user-curated notes that satisfies the relevance threshold associated with the current conversation. For example, as shown in FIG. 1C, the electronic device 20 displays the second portion 62*b* of the user-curated notes 60 on the display 22. In some implementations, presenting the portion of the user-curated notes reduces the need for the user to manually search the user-curated notes or scroll through the user-curated notes to find the portion that is relevant to the current conversation. Reducing the need for the user to manually search or scroll through the user-curated notes results in fewer user inputs. Reducing a number of unnecessary user inputs tends to prolong a battery life of a battery-powered device thereby enhancing operability of the device. Additionally, presenting the portion of the user-curated notes that is relevant to the current conversation enhances a user experience of the device. For example, presenting the portion of the user-curated notes without user intervention allows the user to stay engaged in the current conversation instead of halting the current conversation to search through the user-curated notes.

As represented by block 330*a*, in some implementations, the portion of the user-curated notes was generated within a threshold time period associated with the previous conversation. For example, the portion of the user-curated notes was generated during the previous conversation or within a threshold time after the previous conversation ended. Displaying a portion of the user-curated notes that was generated (e.g., written) during or soon after the previous conversation increases a likelihood of the portion of the user-curated notes more accurately representing the previous conversation.

As represented by block 330*b*, in some implementations, the method 300 includes displaying a visual representation of the portion of the user-curated notes. For example, as shown in FIG. 1C, the electronic device 20 displays the second portion 62*b* of the user-curated notes 60. In some implementations, the portion of the user-curated notes is a voice note (e.g., a voice memo). In such implementations, the method 300 includes performing a speech-to-text operation on the voice note in order to generate text corresponding to the voice note, and displaying the text corresponding to the voice note.

In some implementations, the method 300 includes outputting an aural representation (e.g., an audio representation) of the portion of the user-curated notes via a speaker.

For example, as shown in FIG. 1E, the electronic device 20 outputs the audio 74 corresponding to the second portion 62b of the user-curated notes 60. In some implementations, the portion of the user-curated notes includes text. In such implementations, the method 300 includes performing a text-to-speech operation on the text in order to generate audio corresponding to the text and playing the generated audio on a speaker.

In some implementations, the method 300 includes selecting a presentation mode (e.g., a modality) for presenting the portion of the user-curated notes based on a conversational mode of the current conversation. In some implementations, the method 300 includes selecting a presentation mode for the portion of the user-curated notes that is different from the conversation mode of the current conversation. For example, the method 300 includes selecting a visual presentation mode as the presentation mode for the portion of the user-curated notes when the conversational mode is aural. In some implementations, the method 300 includes selecting an aural presentation mode as the presentation mode for the portion of the user-curated notes when the conversation mode is visual (e.g., textual such as an instant messaging session). In some implementations, selecting a presentation mode that is different from the conversational mode reduces a likelihood that the presentation of the portion of the user-curated notes will interfere with the current conversation.

In some implementations, the method 300 includes selecting a presentation mode for the portion of the user-curated notes that is the same as the conversational mode of the current conversation. For example, if the user and the person are talking, then the presentation mode for the portion of the user-curated notes is aural. In another example, if the user and the person are texting, then the presentation mode for the portion of the user-curated notes includes displaying the portion of the user-curated notes. In some implementations, selecting a presentation mode that is the same as the conversation mode increases a likelihood that the user will notice the presentation of the portion of the user-curated notes.

As represented by block 330c, in some implementations, the method 300 includes displaying an affordance to share the portion of the user-curated notes with the person, detecting a user input directed to the affordance, and sending the portion of the user-curated notes to another device associated with the person in response to detecting the user input. For example, as shown in FIG. 1G, the electronic device 20 displays a share affordance 82, and the electronic device 20 transmits the second portion 62b of the user-curated notes 60 to the electronic device 42 of the person 40 in response to detecting the user input 84 (shown in FIG. 1H) directed to the share affordance 82.

In some implementations, the method 300 includes, prior to the current conversation, receiving a sequence of user inputs corresponding to the user entering the user-curated notes regarding the previous conversation. For example, in some implementations, the user 30 types the user-curated notes 60 into the electronic device 20.

In some implementations, the method 300 includes displaying device-generated notes regarding the previous conversation, receiving a user input approving a first portion of the device-generated notes and rejecting a second portion of the device-generated notes, saving the first portion of the device-generated notes as the user-curated notes, and forgoing saving the second portion of the device-generated notes as the user-curated notes. For example, as discussed in relation to FIG. 2, in some implementations, the note synthesizer 250 generates notes by monitoring a conversation, provides the user options to approve or reject different portions of the notes that the note synthesizer 250 generates, saves the approve portion(s) in the datastore 240, and discards the rejected portion(s).

FIG. 4A is a block diagram of a device 400 that performs conversational augmentation in accordance with some implementations. In some implementations, the device 400 implements the electronic device 20 shown in FIGS. 1A-1I, and/or the conversation augmentation system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the relevance determiner 220, and the content presenter 230. In various implementations, the device 400 performs the method 300 shown in FIG. 3.

In some implementations, the data obtainer 210 obtains data corresponding to a current conversation, and detects a reference to a previous conversation. In some implementations, the data obtainer 210 performs the operation(s) represented by block 310 in FIG. 3. To that end, the data obtainer 210 includes instructions 210a, and heuristics and metadata 210b.

In some implementations, the relevance determiner 220 determines whether there are user-curated notes related to the previous conversation that are relevant to the current conversation. In some implementations, the relevance determiner 220 performs the operations(s) represented by block 320 shown in FIG. 3. To that end, the relevance determiner 220 includes instructions 220a, and heuristics and metadata 220b.

In some implementations, the content presenter 230 presents a portion of the user-curated notes that is relevant to the current conversation. In some implementations, the content presenter 230 performs the operation(s) represented by block 330 shown in FIG. 3. To that end, the content presenter 230 includes instructions 230a, and heuristics and metadata 230b.

In some implementations, the one or more I/O devices 410 include an audio sensor (e.g., a microphone) for capturing audio corresponding to a conversation. In some implementations, the one or more I/O devices 410 include an image sensor (e.g., a camera). In some implementations, the one or more I/O devices 410 include a display (e.g., the display 22 shown in FIG. 1C) for displaying a portion of the user-curated notes. In some implementations, the one or more I/O devices 410 include a speaker for outputting the audio corresponding to a portion of the user-curated notes (e.g., for playing the audio 74 shown in FIG. 1E).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

FIG. 4B illustrates a blow-up view of an optical see-through display 420 in accordance with some implementations. In various implementations, the optical sec-through display 420 includes a selectively occlusive layer 450 that includes a number of pixel elements that, when activated, block light from passing through the optical see-through display 420. Thus, through appropriate addressing of the selectively occlusive layer 450, the optical see-through display 420 can render a black region 451 or a gray region 452. In various implementations, the optical see-through display 420 includes a globally dimmable layer 460 that, according to a controllable dimming level, dims light passing through the optical sec-through display 420. In various implementations, the globally dimmable layer 460 includes one or more of a photochromic element, electrochromic element, an SPD (suspended-particle device) element, GHLC (guest-host liquid crystal) element, or PDLC (polymer-dispersed liquid-crystal) element. In various implementations, the optical see-through display 420 includes a light addition layer 470 that includes a number of pixel elements that, when activated, emit light towards the user. Thus, through appropriate addressing of the light addition layer 470, the optical see-through display 420 can render a white (or colored) virtual object 471. In various implementations, the optical see-through display 420 does not include each of the layers 450, 460, 470. In particular, in various implementations, the optical see-through display 420 does not include the selectively occlusive layer 450 and/or the globally dimmable layer 460. In various implementations, the optical see-through display 420 does not include the light addition layer 470 and/or the globally dimmable layer 460. In various implementations, the optical see-through display 420 does not include the selectively occlusive layer 450 and/or the light addition layer 470.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

That is claimed is:

1. A method comprising:
   at a device including a display, an audio sensor, a processor, and a non-transitory memory:
   obtaining a set of predefined phrases;
   obtaining audio data from the audio sensor;
   determining, based on the audio data, an utterance indicating that a user of the device is in a current conversation with a person;
   determining, based on the audio data, that an audible reference within the current conversation refers to a previous conversation with the person, wherein determining that the audible reference refers to the previous conversation includes identifying a particular predefined phrase, of the set of predefined phrases, that matches the audible reference; and
   in response to determining the audible reference within the current conversation refers to the previous conversation:
   assigning, based on a topic of the current conversation, a relevance score to each of a plurality of portions of user-curated notes related to the previous conversation, wherein the user-curated notes were created-based on a user input detected prior to the current conversation; and
   automatically displaying, on the display, a subset of the plurality of portions of the user-curated notes related to the previous conversation that have relevance scores that satisfy a relevance threshold.

2. The method of claim 1, wherein assigning the relevance score to a particular portion of the user-curated notes includes determining whether the particular portion of the user-curated notes provides information regarding a subject of the current conversation.

3. The method of claim 1, wherein assigning the relevance score to a particular portion of the user-curated notes includes determining whether the particular portion of the user-curated notes provides information that is being requested in the current conversation.

4. The method of claim 1, assigning the relevance score to a particular portion of the user-curated notes includes determining whether the particular portion of the user-curated notes provides an answer to a question being asked in the current conversation.

5. The method of claim 1, wherein the subset of the plurality of portions of the user-curated notes was created by the user within a threshold time period associated with the previous conversation.

6. The method of claim 1, wherein the set of predefined phrases corresponds to a set of one or more trigger phrases.

7. The method of claim 1, wherein identifying the particular predefined phrase includes determining that the particular predefined phrase matches a particular phrase from the previous conversation.

8. The method of claim 1, further comprising outputting an aural representation of the subset of the plurality of portions of the user-curated notes via a speaker.

9. The method of claim 1, further comprising selecting a presentation mode for presenting the subset of the plurality of portions of the user-curated notes based on a conversational mode of the current conversation.

10. The method of claim 9, wherein the presentation mode of the subset of the plurality of portions of the user-curated notes is different from the conversational mode of the current conversation.

11. The method of claim 9, wherein the presentation mode is visual when the conversational mode is aural.

12. The method of claim 9, wherein the presentation mode is aural when the conversational mode is visual.

13. The method of claim 9, wherein the presentation mode is the same as the conversational mode.

14. The method of claim 1, wherein the current conversation is an in-person conversation.

15. The method of claim 1, wherein the current conversation is a phone conversation.

16. The method of claim 1, wherein the current conversation includes a messaging session.

17. The method of claim 1, wherein detecting the user input comprises detecting text typed via a keyboard.

18. The method of claim 1, wherein detecting the user input comprises detecting text dictated via the audio sensor.

19. The method of claim 1, wherein detecting the user input comprises detecting an image captured via an image sensor.

20. The method of claim 1, wherein the display comprises a touchscreen display and wherein detecting the user input comprises detecting handwritten notes via the touchscreen display.

21. The method of claim 1, wherein automatically displaying the subset of the plurality of portions includes forgoing display of at least one of the plurality of portions that has a relevance score that does not satisfy the relevance threshold.

22. A non-transitory memory storing one or more programs, which, when executed by one or more processors of a device, cause the device to:
   obtain a set of predefined phrases;
   obtain audio data from an audio sensor;
   determine, based on the audio data, an utterance indicating that a user of the device is in a current conversation with a person;
   determine, based on the audio data, that an audible reference within the current conversation refers to a previous conversation with the person, wherein determining that the audible reference refers to the previous conversation includes identifying a particular predefined phrase, of the set of predefined phrases, that matches the audible reference; and
   in response to determining the audible reference within the current conversation refers to the previous conversation:
   assign, based on a topic of the current conversation, a relevance score to each of the a plurality of portions of user-curated notes related to the previous conversation, wherein the user-curated notes were created based on a user input detected prior to the current conversation; and
   automatically display, on the display, a subset of the plurality of portions of the user-curated notes related to the previous conversation that have relevance scores that satisfy a relevance threshold.

23. A device comprising:
   one or more processors;
   an audio sensor;
   a non-transitory memory;
   one or more displays; and one or more programs stored in the non-transitory memory, which, when executed by the one or more processors, cause the device to:

obtain a set of predefined phrases;

obtain audio data from the audio sensor;

determine, based on the audio data, an utterance indicating that a user of the device is in a current conversation with a person;

determine, based on the audio data, that an audible reference within the current conversation refers to a previous conversation with the person, wherein determining that the audible reference refers to the previous conversation includes identifying a particular predefined phrase, of the set of predefined phrases, that matches the audible reference; and in response to determining the audible reference within the current conversation refers to the previous conversation:

assign, based on a topic of the current conversation, a relevance score to each of a plurality of portions of user-curated notes related to the previous conversation, wherein the user-curated notes were created based on a user input detected prior to the current conversation; and automatically display, on the one or more displays, a subset of the plurality of portions of the user-curated notes related to the previous conversation that have relevance scores that satisfy a relevance threshold.

* * * * *